Aug. 3, 1965  B. H. BROWN  3,198,318
IDLER ROLL ASSEMBLY
Filed April 20, 1964

INVENTOR.
Billy H. Brown
BY
Jennings, Carter & Thompson
Attorneys

United States Patent Office 3,198,318
Patented Aug. 3, 1965

3,198,318
IDLER ROLL ASSEMBLY
Billy H. Brown, Winfield, Ala., assignor to Continental Conveyor & Equipment Company, a corporation of Alabama
Filed Apr. 20, 1964, Ser. No. 360,844
6 Claims. (Cl. 198—192)

This invention relates to an idler roll assembly and more particularly to an idler roll assembly for a belt conveyor in which the ends of the idler roll are supported by upstanding frame members.

An object of my invention is to provide an idler roll assembly which shall be especially adapted for use with a troughing belt conveyor in which the rolls are angularly disposed with respect to each other.

A more specific object of my invention is to provide an idler roll assembly of the character designated which shall include a composite unit which serves as a supporting and adjusting nut for the ends of the roll and at the same time serves to prevent the ingress of foreign materials into the bearing area of the roll.

Another object of my invention is to provide an idler roll assembly of the character designated which shall also include improved means for lubricating the bearings through the supporting nut for the rolls and a lubricant passageway in an adjacent portion of the supporting shaft for the roll.

Another object of my invention is to provide an idler roll assembly of the character designated which shall include a resilient lip-type seal which encircles an inner portion of the supporting nut and an outer labyrinth seal between the retaining nut and an adjacent portion of the roll, thus preventing the ingress of dust and other foreign materials into the vicinity of the inner lip-type seal.

Another object of my invention is to provide an idler roll assembly of the character designated which shall include improved means for securing the supporting nuts to upstanding frame members whereby the rolls are positively and accurately held in place and at the same time may be assembled and disassembled with a minimum of effort.

A further object of my invention is to provide an idler roll assembly of the character designated in which the supporting nut also serves as means for accurately adjusting the pressure exerted against the bearing units for the roll.

A still further object of my invention is to provide an idler roll assembly of the character designated which shall be simple of construction, economical of manufacture and one which is adapted for use with conventional type idler rolls.

Heretofore in the art to which my invention relates, many idler roll assemblies have been proposed wherein separate means were employed to hold the rolls in the frames, to prevent the ingress of foreign materials into the bearing area and to introduce lubricant into the area adjacent the bearing units for the rolls.

In accordance with the present invention, I provide a composite unit which serves as a positive hold-down means for the roll and at the same time permits accurate adjustment of the pressure applied to the bearing units. Also, the composite unit includes inner sealing elements adjacent the bearing units and outer labyrinth sealing means between a retaining nut and the roller whereby dust, dirt, water and other foreign materials cannot enter the bearing area. Still further, the composite unit includes improved means for introducing lubricant through the support nut and an adjacent portion of the supporting shaft for the roll whereby lubricant may be easily introduced into the bearing area.

Apparatus embodying features of my invention is illustrated in the accompanying drawing, forming a part of this application, in which.

Figure 3:
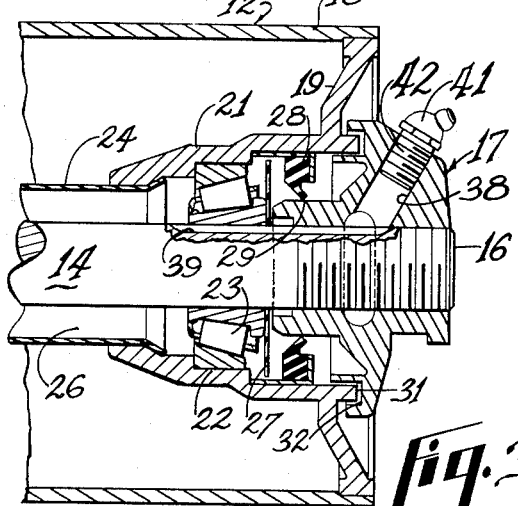
FIG. 3 is a sectional view taken generally along the line 3—3 of FIG. 2 and showing a fragment of the roll.

Referring now to the drawing for a better understanding of my invention, I shown an idler frame 10 having upstanding frame members 11 for supporting the ends of idler rolls 12 in a manner to be described hereinafter. The rolls 12 are shown as being angularly disposed with respect to each other for use with a troughing belt conveyor 13. As shown in FIG. 3, a shaft 14 extends through the roll 12 and is provided with threaded end portions 16 for receiving internal threads of a supporting nut 17.

Each idler roll 12 comprises a cylinder 18 having the usual head 19 at each end thereof. Each head 19 is provided with an inwardly extending hub portion 21 which defines bearing recesses 22 for receiving tapered roller bearing units indicated generally at 23. Accordingly, the rolls 12 are supported by the bearing units 23 which are interposed between the shaft 14 and the bearing recesses in a manner well understood in the art. In FIG. 3 of the drawings, I show the inner ends of the hubs 21 as being connected to the ends of a sleeve member 24 which surrounds the shaft 14 intermediate the hubs. Accordingly, the sleeve member 24 defines a lubricant passageway 26 which communicates with the area adjacent both bearing units 23 for the roll 12. Lubricant may thus be introduced into the bearing area adjacent one end of the roll 12 and then forced through the lubricant passageway 26 to the bearing area adjacent the other end of the roll.

Surrounding the shaft 14 between the outer end of the bearing unit 23 and the innermost end of the supporting nut 17 is a washer 27. Mounted within the hub 21 outwardly of the washer 27 is a resilient annular seal 28 which is provided with a lip portion that surrounds and slidably engages an annular surface 29 provided on the outer surface of he supporting nut 17. That is, the resilient seal 28 is carried by the hub 21 for the roll whereby it rotates with the roll. Accordingly the resilient seal 28, the adjacent surface of the washer 27 and the innermost end of the nut 17 define a labyrinth seal adjacent the outer surface of the bearing unit 23.

As shown in FIG. 3, an annular flange 31 projects outwardly of the head 19 in position to extend parallel to the shaft 14. Accordingly, the shaft 15 is concentric with the annular flange 31. The supporting nut 17 is provided with an inwardly opening annular groove 32 for receiving the annular flange 31 with a relatively close fit to thereby define an outer labyrinth seal between the supporting nut and the adjacent portion of the roll 12. The outer labyrinth seal thus provides a positive method for keeping out dust, dirt, water and other foreign materials.

Figure 1:
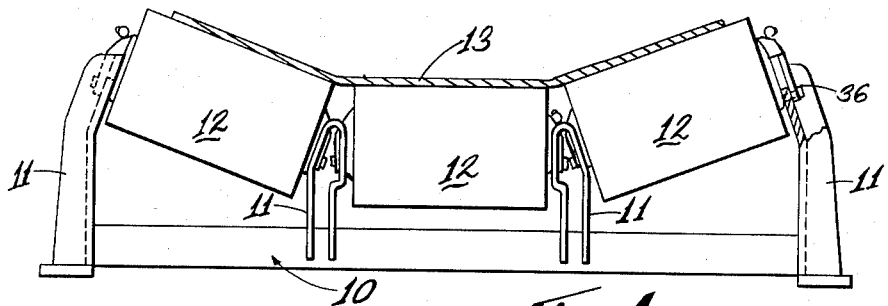
FIG. 1 is an elevational view showing an idler roll assembly for a troughing belt conveyor having my improved apparatus associated therewith, parts being broken away and in section.
Figure 2:
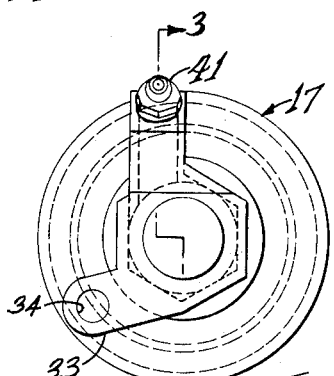
FIG. 2 is an end elevational view showing the supporting nut removed from the roll and the supporting frame.
Figures 4, 5, 6:
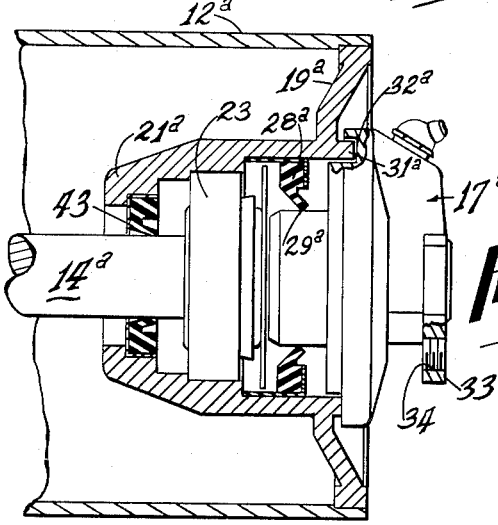
FIG. 4 is a fragmental view showing the means for securing the supporting nut to an upstanding frame member.
FIG. 5 is a sectional view corresponding to FIG. 3 but showing a modified form of my invention; and, FIG. 6 is a fragmental view showing alternate means for attaching the supporting nut to an upstanding frame member.

As shown in FIGS. 2 and 4, a lug 33 projects laterally of the supporting nut 17 and is provided with a threaded opening 34 therein for receiving a cap screw 36. An opening 37 is provided through the upstanding frame member 11 of the idler frame for receiving the inner end of the cap screw 36, as shown in FIG. 1, whereby the supporting nut 17 is secured to the upstanding frame member 11 to thereby hold the adjacent end of the roll 12 in a positive and accurate manner.

A downwardly and inwardly extending opening 38 is provided in the supporting nut 17, as shown in FIG. 3. The lower end of the opening 38 communicates with an outwardly opening recess 39 which extends longitudinally of the shaft 14. The inner end of the outwardly opening recess 39 terminates inwardly of and in spaced relation to the inner surface of the bearing unit 23 whereby lubricant is supplied to the bearings. Also, as described hereinabove, lubricant introduced through the passageway 39 is adapted to flow through the lubricant passageway in the sleeve 24 whereby the bearing unit adjacent the other end of the sleeve member 24 may be lubricated. A conventional type lubricant fitting 41 is inserted in and connected to the outer portion of the opening 38 by a suitable threaded connection 42. Accordingly, lubricant introduced through the fitting 41 passes downwardly through the opening 38 and thence through the longitudinally extending passageway 39 to the inner side of the bearing unit 23. Accordingly, lubricant is introduced inwardly of the bearing unit whereby the lubricant is forced outwardly around the washer 27 and through the inner labyrinth seal, thus further preventing the entrance of any foreign materials into the bearing area and at the same time forcing foreign materials outwardly of both labyrinth seals.

In FIG. 5 of the drawing, I show a modified form of my invention in which the idler roller indicated at 12ᵃ is provided with heads 19ᵃ. Hub portions 21ᵃ are formed integrally with the heads 19ᵃ and extend inwardly for receiving bearing units indicated generally at 23. Instead of the hub 21ᵃ being connected to a sleeve member 24, a resilient lip seal 43 is carried by the inner surface of the hub 21 in position for an annular lip of the seal to slidably engage the supporting shaft indicated at 14ᵃ. This construction permits the bearing cavity to be sealed thereby providing a sealed-in unit which prevents the lubricant from flowing from one bearing area to another where the rolls are inclined or are angularly disposed with respect to each other.

The roll 12ᵃ is supported by a supporting nut 17ᵃ having an annular bearing surface 29ᵃ adjacent the inner end thereof in position to be slidably engaged by the lip of a resilient lip seal 28ᵃ. Also, an outer labyrinth seal is defined by providing an annular flange 31ᵃ on the head 19ᵃ and an inwardly opening recess 32ᵃ on the supporting nut 17ᵃ.

The supporting nut 17ᵃ is provided with a laterally projecting lug 33 having a threaded opening 34 therein for receiving the cap screw 36, as described hereinabove, whereby the supporting nut 17ᵃ is attached to an upstanding frame member 11.

In FIG. 6 of the drawing, I show a further modified form of my invention in which a trough opening 34ᵇ is provided in the laterally projecting lug 33 in position to slidably receive the cap screw 36. A threaded opening 37ᵇ is provided in the upstanding frame member 11 whereby the cap screw is held in place by threaded engagement with the opening 37ᵇ in the upstanding frame member 11 rather than being threadedly connected to the lug 33.

From the foregoing description, it will be seen that I have devised an improved idler roll assembly for a belt conveyor in which the ends of the idler roll are supported by upstanding frame members. By providing inner lip seals which slidably engage the supporting nut outwardly of the bearing units and outer labyrinth seals between the supporting nut and an outwardly projecting, annular flange carried by the roll, I eliminate the ingress of foreign materials into the bearing area. Also, by providing means for introducing the lubricant through the supporting nut and an outwardly opening recess which extends longitudinally of the shaft to a point inwardly of the bearing unit, the lubricant is always introduced adjacent the inner sides of the bearing units whereby the lubricant moves in a direction opposite the direction at which any foreign materials could possibly enter the bearing area, thereby further assuring that no foreign materials enter the vicinity of the bearing units and at the same time filling all cavities adjacent the bearing unit with new lubricant. Furthermore, by providing positive hold-down means for the supporting nut which secures the supporting nut in a fixed position on the upstanding supporting frame, the supporting nut may be rotated to selected positions to thereby accurately control the pressure exerted against the bearing unit and at the same time the supporting nut is held accurately in place.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In an idler roll assembly for a belt conveyor in which the ends of the idler roll are supported by upstanding frame members:
    (a) a shaft extending through said roll and having threaded end portions,
    (b) a supporting nut threadedly engaging each of said threaded end portions,
    (c) bearing units mounted between the roll and the shaft inwardly of the ends of each supporting nut for supporting the roll for rotation about said shaft,
    (d) a washer surrounding and carried by said shaft between each nut and the bearing unit adjacent thereto,
    (e) a resilient seal carried by said roll and having an annular lip in position to surround and slidably engage each nut outwardly of said washer to define with the adjacent portions of said nut and washer an inner labyrinth seal,
    (f) an outer labyrinth seal between each nut and an adjacent portion of said roll,
    (g) an outwardly projecting lug carried by each nut in position to extend alongside the upstanding frame member adjacent thereto, and
    (h) a retaining element securing each lug to the frame member adjacent thereto to provide positive holding of the roll in said frame members.

2. In an idler roll assembly as defined in claim 1 in which a lubricant passageway is provided in the supporting nut and an adjacent portion of said shaft to introduce lubricant inwardly of an adjacent bearing unit.

3. In an idler roll assembly as defined in claim 1 in which an elongated sleeve member surrounds said shaft intermediate said bearing units to define a lubricant passageway which communicates with both bearing units.

4. In an idler roll assembly as defined in claim 1 in which the outer labyrinth seal between each nut and an adjacent portion of said roll comprises:
    (a) an outwardly projecting, annular member carried by said roll and extending generally parallel to and concentric with said shaft, and
    (b) said nut having an inwardly opening annular groove therein disposed to receive said annular member with a close fit.

5. In an idler roll assembly as defined in claim 1 in which the retaining element securing each lug to the frame member adjacent thereto comprises:
    (a) an elongated threaded member, and
    (b) there being aligned openings through said lug and said frame member with at least one of said aligned openings being threaded to receive the threads of said threaded member.

6. In an idler roll assembly for a belt conveyor in which the ends of the idler roll are supported by upstanding frame members:
(a) a shaft extending through said roll and having threaded end portions,
(b) a supporting nut threadedly engaging each of said threaded end portions,
(c) bearing units mounted between the roll and the shaft inwardly of the ends of each supporting nut for supporting the roll for rotation about said shaft,
(d) an inner resilient lip seal carried by said roll and surrounding said shaft with a sliding fit inwardly of each bearing unit,
(e) a washer surrounding and carried by said shaft between each nut and the bearing unit adjacent thereto,
(f) an intermediate resilient seal carried by said roll and having a lip in position to surround and slidably engage each nut outwardly of said washers to define with the adjacent portions of said nut and washer an inner labyrinth seal,
(g) an outer labyrinth seal between each nut and an adjacent portion of said roll,
(h) an outwardly projecting lug carried by each nut in position to extend alongside the upstanding frame member adjacent thereto, and
(i) a retaining element securing each lug to the frame member adjacent thereto to provide positive holding of the roll in said frame members.

References Cited by the Examiner
UNITED STATES PATENTS 2,702,868  2/55  Kindig _____ 308—20

SAMUEL F. COLEMAN, *Primary Examiner.*

RICHARD E. AEGERTER, *Examiner.*